US012576407B2

(12) United States Patent
Wang

(10) Patent No.: US 12,576,407 B2
(45) Date of Patent: Mar. 17, 2026

(54) PORTABLE PAPER SHREDDER

(71) Applicant: Dongguan Taijie Electronic Technology Co., Ltd., Dongguan (CN)

(72) Inventor: Huize Wang, Dongguan (CN)

(73) Assignee: Dongguan Taijie Electronic Technology Co., Ltd., Dongguan (CN)

(*) Notice: Subject to any disclaimer, the term of this patent is extended or adjusted under 35 U.S.C. 154(b) by 274 days.

(21) Appl. No.: 18/228,823

(22) Filed: Aug. 1, 2023

(65) Prior Publication Data

US 2024/0042456 A1 Feb. 8, 2024

(30) Foreign Application Priority Data

Aug. 2, 2022 (CN) ......................... 202222016815.1

(51) Int. Cl.
*B02C 18/00* (2006.01)
*B02C 18/14* (2006.01)

(52) U.S. Cl.
CPC ........ *B02C 18/0007* (2013.01); *B02C 18/142* (2013.01); *B02C 2018/0038* (2013.01); *B02C 2018/0046* (2013.01)

(58) Field of Classification Search
CPC .............. B02C 18/0007; B02C 18/142; B02C 2018/0046; A47J 42/24; A47J 42/34
See application file for complete search history.

(56) References Cited

U.S. PATENT DOCUMENTS

| | | | | |
|---|---|---|---|---|
| 5,853,131 A * | 12/1998 | Cheng | B02C 18/0007 241/236 |
| 8,382,020 B2 * | 2/2013 | Su | B02C 18/0007 241/236 |
| 11,433,398 B1 * | 9/2022 | Tal | B02C 18/16 |
| 2019/0104887 A1 * | 4/2019 | Tussey | B02C 18/24 |

* cited by examiner

*Primary Examiner* — Mohammed S. Alawadi
(74) *Attorney, Agent, or Firm* — BOND, SCHOENECK & KING, PLLC; George R. McGuire

(57) ABSTRACT

Provided is a portable paper shredder, relating to the technical field of portable paper shredding devices. The portable paper shredder includes a chassis and a core disposed in the chassis. The core includes a rotating drive member and a cutter assembly that are in transmission connection. The chassis is provided with a paper shredding passage. A paper shredding end of the cutter assembly is located in the paper shredding passage. The paper shredding passage penetrates the chassis. Two ends of the paper shredding passage are provided with a paper feeding end opening and a paper outfeeding end opening separately. A side of the paper shredding passage extends outwards and forms an open notch on the sidewall of the chassis. The open notch directly communicates with the paper feeding end opening. Therefore, the portable paper shredder can broaden the application scope, help achieve miniaturization and improve portability.

20 Claims, 5 Drawing Sheets

PORTABLE PAPER SHREDDER

CROSS-REFERENCE TO RELATED APPLICATION

This application claims priority to Chinese patent application No. 202222016815.1 filed with the CNIPA on Aug. 2, 2022, the disclosure of which is incorporated herein by reference in its entirety.

TECHNICAL FIELD

The present disclosure relates to the technical field of portable paper shredding devices and, in particular, to a portable paper shredder.

BACKGROUND

A paper shredder is an office device composed of a group of rotating blades, a paper comb and a drive motor. A sheet of paper is fed from the space between the blades engaged with each other and is shredded into a lot of pieces for confidentiality.

As a kind of paper shredder, a portable paper shredder is small and lightweight and is very easy to carry. However, since the volume of the portable paper shredder needs to be strictly controlled, the size of a paper feeding mouth is too small to satisfy the paper shredding requirements of A4 paper and paper with larger sizes, so the sheet of paper needs to be folded to adapt to the paper feeding mouth, increasing load on the motor and being unable to perform partial paper shredding on the sheet of paper.

Therefore, a portable paper shredder is urgently needed to solve the preceding technical problems.

SUMMARY

Based on the preceding description, the present disclosure provides a portable paper shredder to broaden the application scope of the portable paper shredder, help achieve miniaturization and improve portability. In this way, there is no need to fold a sheet of paper for paper feeding so that load and torque requirements of a rotating drive member can be lowered to select a rotating drive member having a lower power, reducing the production cost and fulfilling the function of partial paper shredding.

To achieve the preceding object, the present disclosure provides the technical solutions below.

A portable paper shredder is provided. The portable paper shredder includes a chassis and a core disposed in the chassis, where the core includes a rotating drive member and a cutter assembly that are in transmission connection, the chassis is provided with a paper shredding passage, a paper shredding end of the cutter assembly is located in the paper shredding passage, the paper shredding passage penetrates the chassis, two ends of the paper shredding passage are provided with a paper feeding end opening and a paper outfeeding end opening separately, a side of the paper shredding passage extends outwards and forms an open notch on a sidewall of the chassis, and the open notch directly communicates with the paper feeding end opening.

In an exemplary embodiment, along a penetration direction of the paper shredding passage, the open notch penetrates the sidewall of the chassis and directly communicates with the paper outfeeding end opening.

In an exemplary embodiment, the chassis includes a first housing and a second housing that are interconnected, and the first housing and the second housing are each a hollow structure and are enclosed to form a cavity structure to accommodate the core.

In an exemplary embodiment, the paper shredding passage penetrates the first housing and the second housing, the paper feeding end opening is disposed on the first housing, and the paper outfeeding end opening is disposed on the second housing.

In an exemplary embodiment, a first reinforcement plate is disposed inside the cavity structure, is connected to the first housing and located between the first housing and the cutter assembly and is a U-shaped plate structure, and the paper shredding passage is inserted through a bypass groove of the first reinforcement plate; and/or a second reinforcement plate is disposed inside the cavity structure, is connected to the second housing and located between the second housing and the cutter assembly and is a U-shaped plate structure, and the paper shredding passage is inserted through a bypass groove of the second reinforcement plate.

In an exemplary embodiment, two sides of the paper feeding end opening are each provided with a first sawtooth edge, a paper shredding portion of the cutter assembly extends into the paper shredding passage via a notch portion of the first sawtooth edge, and first sawtooth edges on the two sides of the paper feeding end opening are staggered; and/or two sides of the paper outfeeding end opening are each provided with a second sawtooth edge, the paper shredding portion of the cutter assembly extends into the paper shredding passage via a notch portion of the second sawtooth edge, and second sawtooth edges on the two sides of the paper outfeeding end opening are staggered.

In an exemplary embodiment, a side of the first sawtooth edge facing away from the paper shredding passage is provided with a first reverse round corner for providing an avoidance space for the cutter assembly; and/or a side of the second sawtooth edge facing away from the paper shredding passage is provided with a second reverse round corner for providing an avoidance space for the cutter assembly.

In an exemplary embodiment, the cutter assembly includes two knife rollers that are spaced apart side by side, each of the two knife rollers are provided with multiple paper shredding knives that are spaced apart along a length direction of each of the two knife rollers, multiple paper shredding knives on one of the two knife rollers and multiple paper shredding knives on another of the two knife rollers are staggered, the paper shredding passage is inserted between the two knife rollers, and the multiple paper shredding knives extend into the paper shredding passage.

In an exemplary embodiment, the multiple paper shredding knives on the two knife rollers (41) are each a cylindrical structure, and two ends of each of the multiple paper shredding knives are each provided with an annular unedged blade.

In an exemplary embodiment, the core further includes a stripping structure including two stripping blades, the two stripping blades are disposed at two ends of the two knife rollers facing the open notch in one-to-one correspondence, and cutting portions of the two stripping blades extend into the paper shredding passage.

In an exemplary embodiment, a first support plate, a second support plate and a third support plate are securely disposed inside the chassis, the first support plate is disposed at an end of the cutter assembly facing away from the open notch, the second support plate and the third support plate are disposed at an end of the cutter assembly facing the open notch, the first support plate is provided with a first mounting through hole and a second mounting through hole, the second support plate is provided with a third mounting through hole, the third support plate is provided with a fourth mounting through hole, one of the two knife rollers is rotatably inserted through the first mounting through hole and the third mounting through hole, and another of the two knife rollers is rotatably inserted through the second mounting through hole and the fourth mounting through hole.

In an exemplary embodiment, one of the two knife rollers is in transmission connection with the rotating drive member through a coupling, and the two knife rollers are in transmission connection with each other through a transmission gear assembly.

In an exemplary embodiment, the rotating drive member includes a micromotor whose rated voltage does not exceed 36 volts.

In an exemplary embodiment, an outside of the chassis is provided with a accommodating groove, and the portable paper shredder further includes an opener detachably connected to the accommodating groove.

In an exemplary embodiment, one of the opener and the chassis is provided with a magnetic attraction iron sheet, and another one of the opener and the chassis is provided with a magnet, and the opener is magnetically attracted to the chassis through the magnetic attraction iron sheet and the magnet.

In an exemplary embodiment, a sidewall of the accommodating groove is provided with a limiting boss for limiting a mounting position of the opener inside the accommodating groove.

The present disclosure has the beneficial effects below.

The chassis of the portable paper shredder according to the present disclosure is provided with the paper shredding passage. The side of the paper shredding passage extends outwards and forms the open notch on the sidewall of the chassis. When the sheet of paper is shredded, a portion of the sheet of paper passes through the open notch and enters the paper shredding passage from the paper feeding end opening while the other portion of the sheet of paper is located outside the chassis, and the traditional single paper shredding mode is changed to a segmented paper shredding mode so that the matching requirements between the size of the paper feeding end opening and the size of a sheet of paper can be lowered, and the portable paper shredder can match various sizes of paper, helping broaden the application scope of the portable paper shredder. Moreover, the open notch can enable the chassis to break through the size limits so that miniaturization can be achieved, and portability can be improved, thereby broadening the use scenarios of the paper shredder. In addition, there is no need to fold the sheet of paper for paper feeding so that the load and torque requirements of the rotating drive member can be lowered to select a rotating drive member having a lower power, thereby reducing the production cost and fulfilling the function of partial paper shredding.

BRIEF DESCRIPTION OF DRAWINGS

To illustrate the technical solutions in embodiments of the present disclosure more clearly, the drawings used in the description of the embodiments of the present disclosure are briefly described below. Apparently, the drawings described below illustrate only part of the embodiments of the present disclosure, and those of ordinary skill in the art may obtain other drawings based on the embodiments of the present disclosure and the drawings on the premise that no creative work is done.

REFERENCE LIST

Figure 1:
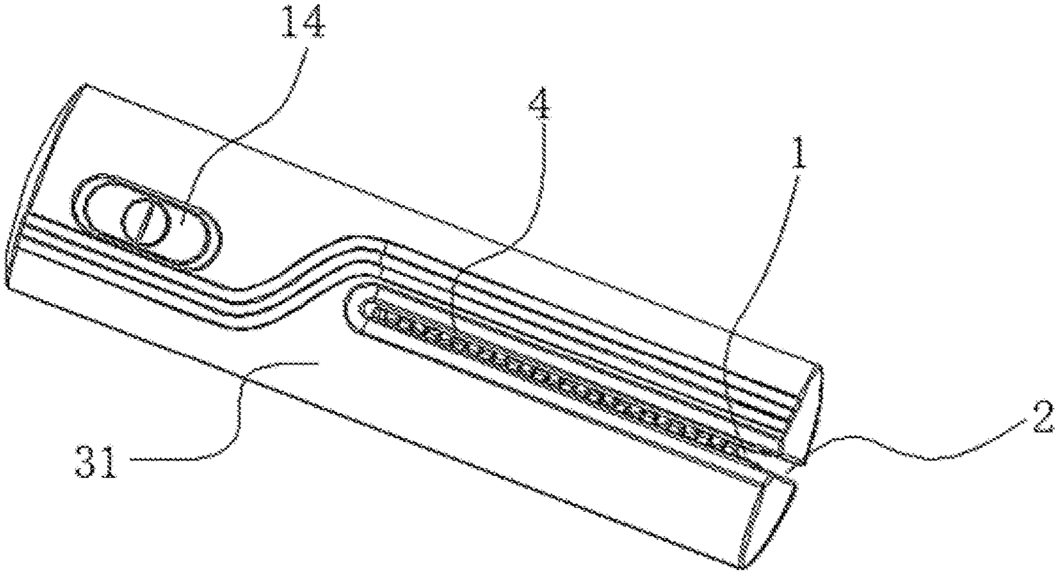
FIG. 1 is a front view of a portable paper shredder according to embodiments of the present disclosure.

1 paper shredding passage
2 open notch
31 first housing
311 first sawtooth edge
3111 first reverse round corner
312 first upper slot
313 second upper slot
314 third upper slot
32 second housing
321 second sawtooth edge
3211 second reverse round corner
322 first lower slot
323 second lower slot
324 third lower slot
325 accommodating groove
326 limiting boss
327 pullout groove
4 cutter assembly
41 knife roller
42 paper shredding knife
43 unedged blade
44 stripping blade
5 rotating drive member
61 first reinforcement plate
611 first bypass groove
62 second reinforcement plate
621 second bypass groove
7 coupling
8 first support plate
81 first mounting through hole
82 second mounting through hole
9 second support plate
91 third mounting through hole
10 third support plate
101 fourth mounting through hole
11 opener
12 magnet
13 switch
14 knob

DETAILED DESCRIPTION

To make solved technical problems, provided technical solutions and achieved technical effects of the present disclosure clearer, the technical solutions in the embodiments of the present disclosure are further described in detail below in conjunction with the drawings. Apparently, the embodiments described below are part, not all, of the embodiments of the present disclosure. Based on the embodiments of the present disclosure, all other embodiments obtained by those skilled in the art are within the scope of the present disclosure on the premise that no creative work is done.

As shown in FIGS. 1 to 6, this embodiment provides a portable paper shredder. The portable paper shredder includes a chassis and a core disposed in the chassis. The chassis includes a rotating drive member 5 and a cutter assembly 4 that are in transmission connection. The chassis is provided with a paper shredding passage 1. A paper shredding end of the cutter assembly 4 is located in the paper shredding passage 1. The paper shredding passage 1 penetrates the chassis. Two ends of the paper shredding passage 1 are provided with a paper feeding end opening and a paper outfeeding end opening separately.

Figure 2:
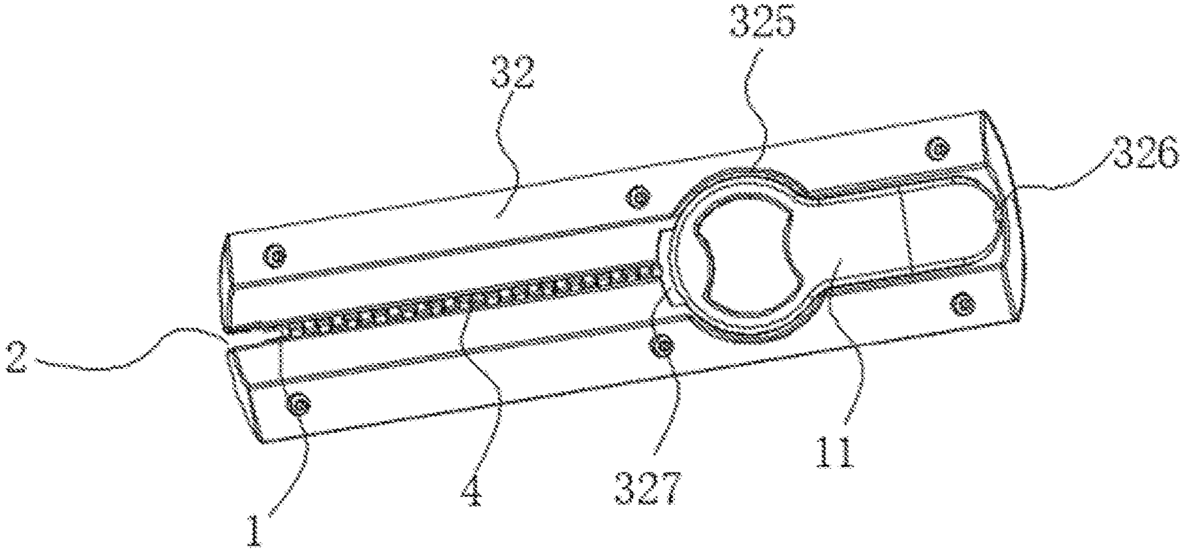
FIG. 2 is a back view of a portable paper shredder according to embodiments of the present disclosure.

Further, as shown in FIGS. 1 and 2, a side of the paper shredding passage 1 extends outwards and forms an open notch 2 on the sidewall of the chassis, and the open notch 2 directly communicates with the paper feeding end opening.

In an exemplary embodiment, the chassis of the portable paper shredder according to this embodiment is provided with the paper shredding passage 1. The side of the paper shredding passage 1 extends outwards and forms the open notch 2 on the sidewall of the chassis. When a sheet of paper is shredded, a portion of the sheet of paper passes through the open notch 2 and enters the paper shredding passage 1 from the paper feeding end opening while the other portion of the sheet of paper is located outside the chassis, and the traditional single paper shredding mode is changed to a segmented paper shredding mode so that the matching requirements between the size of the paper feeding end opening and the size of a sheet of paper can be lowered, and the portable paper shredder can match various sizes of paper, helping broaden the application scope of the portable paper shredder. Moreover, the open notch 2 can enable the chassis to break through the size limits so that miniaturization can be achieved, and portability can be improved, thereby broadening the use scenarios of the portable paper shredder. In addition, there is no need to fold the sheet of paper for paper feeding so that the load and torque requirements of the rotating drive member 5 can be lowered to select a rotating drive member 5 having a lower power, thereby reducing the production cost and fulfilling the function of partial paper shredding.

Exemplarily, as shown in FIGS. 1 and 2, along the penetration direction of the paper shredding direction 1, the open notch 2 penetrates the sidewall of the chassis and directly communicates with the paper feeding end opening. That is, the open notch 2 directly communicates with the paper feeding end opening and the paper outfeeding end opening simultaneously so that the non-shredding portion of the sheet of paper can pass through the chassis more smoothly, the interference between the chassis and the sheet of paper can be prevented, and the feeding direction of the shredded paper can be prevented from being affected, thereby making the paper shredding region more accurate.

Figure 3:
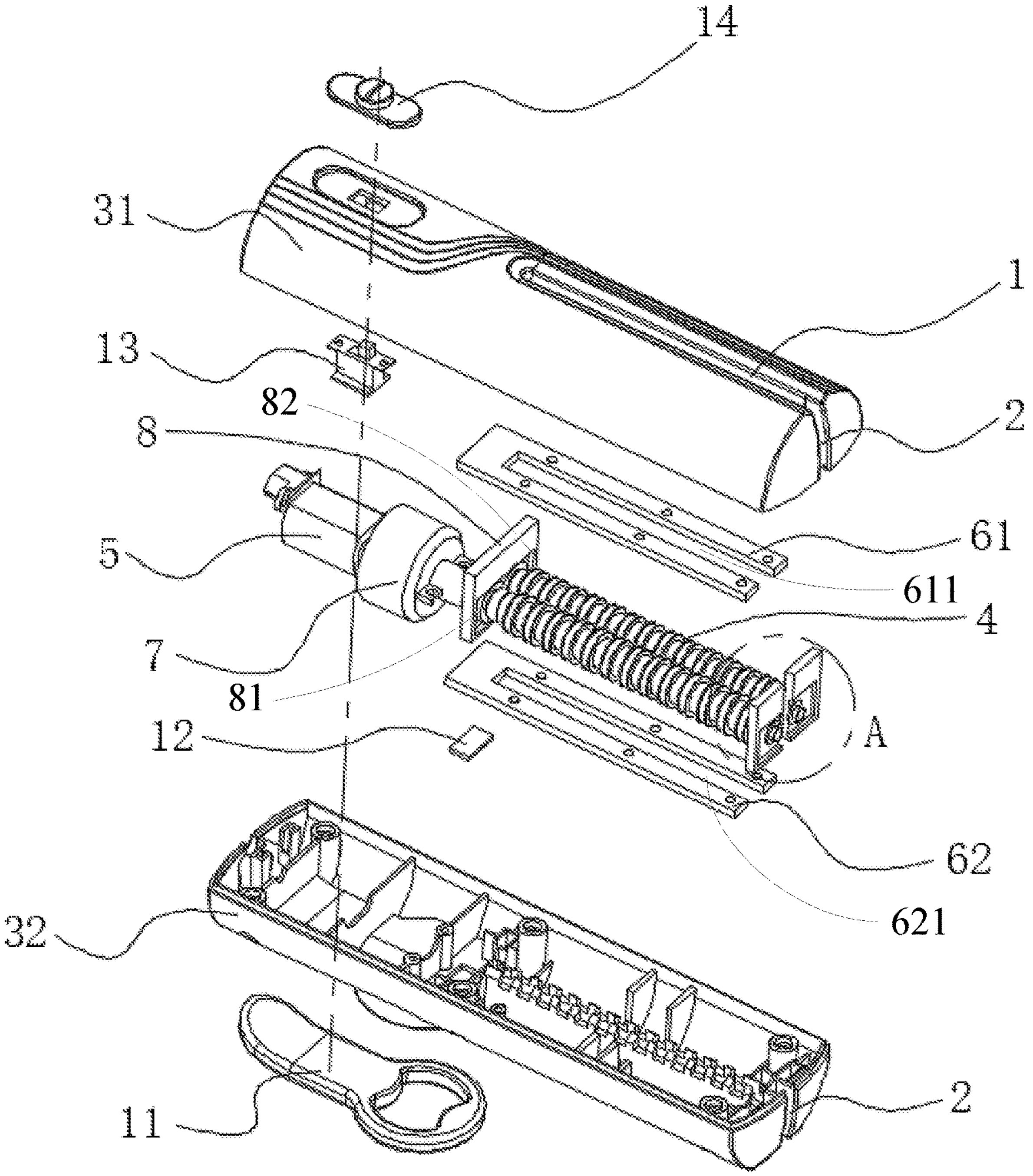
FIG. 3 is an exploded view of a portable paper shredder according to embodiments of the present disclosure.

Exemplarily, as shown in FIG. 3, the chassis includes a first housing 31 and a second housing 32 that are interconnected through fastening screws or inserted pins, and the first housing 31 and the second housing 32 are each a hollow structure and are enclosed to form a cavity structure to accommodate the core.

Figure 5:
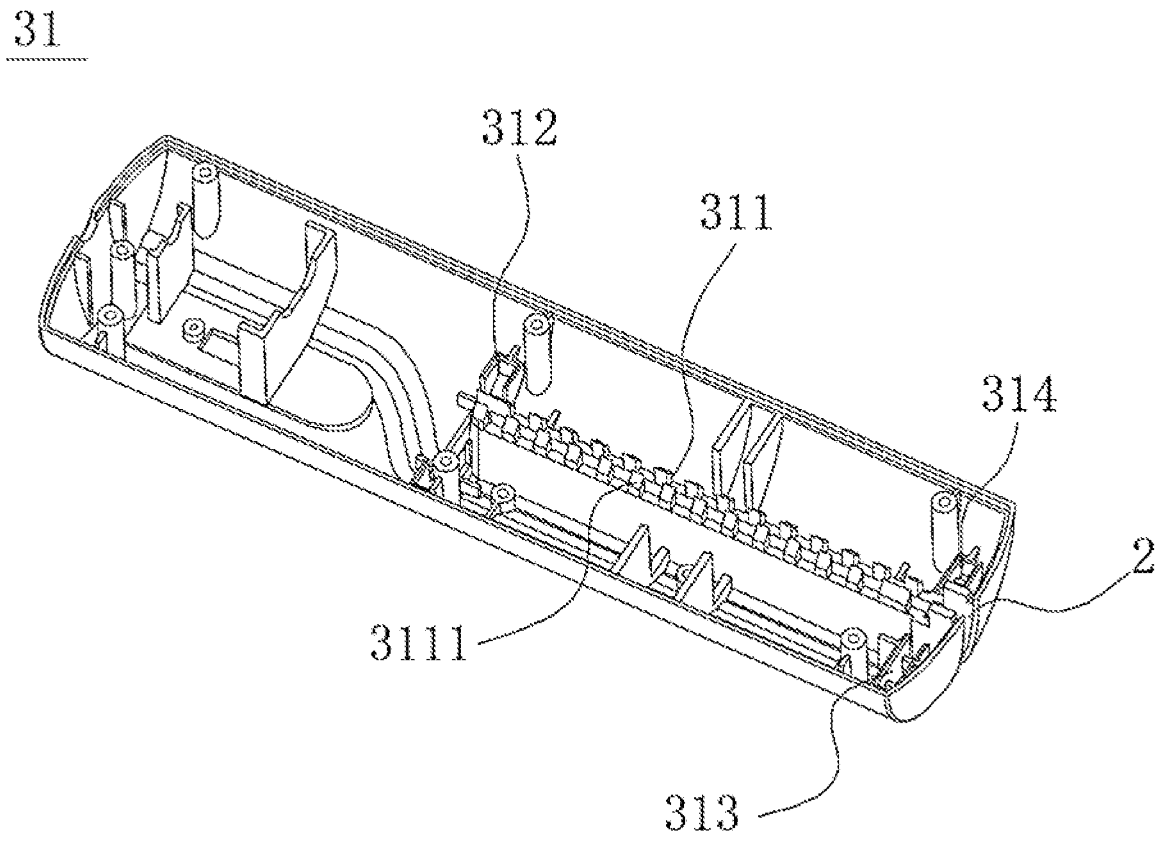
FIG. 5 is a view illustrating the structure of a first housing according to embodiments of the present disclosure.
Figure 6:
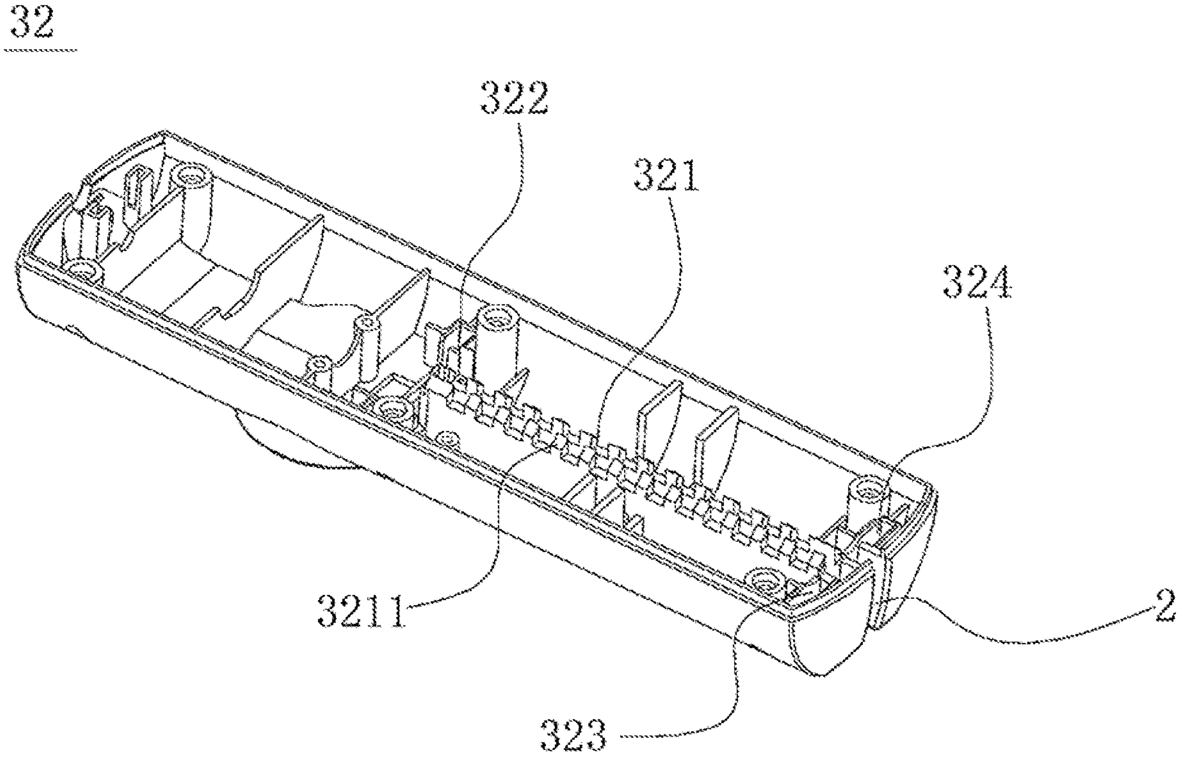
FIG. 6 is a view illustrating the structure of a second housing according to embodiments of the present disclosure.

Exemplarily, as shown in FIGS. 3, 5 and 6, the paper shredding passage 1 penetrates the first housing 31 and the second housing 32, the paper feeding end opening is disposed on the first housing 31, and the paper outfeeding end opening is disposed on the second housing 32. Correspondingly, the open notch 2 also penetrates the sidewall of the first housing 31 and the sidewall of the second housing 32.

Figure 4:
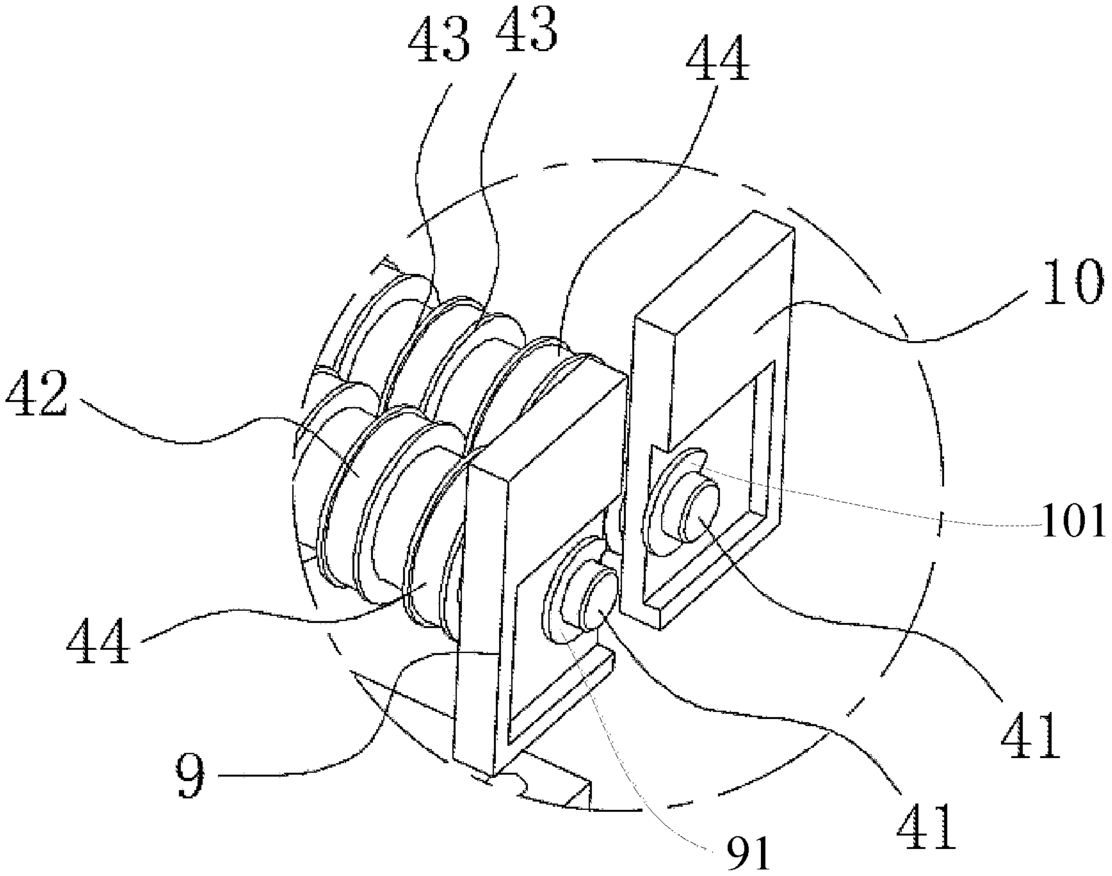
FIG. 4 is an enlarged view of region A in FIG. 3.

Exemplarily, as shown in FIGS. 3 and 4, the cutter assembly 4 includes two knife rollers 42 that are spaced apart side by side. One of the two knife rollers 41 is in transmission connection with the rotating drive member 5 through a coupling 7. The two knife rollers 41 are in transmission connection with each other through a transmission gear assembly and rotate in reverse. Each of the two knife rollers 41 is provided with multiple paper shredding knives 42 that are spaced apart along the length direction of the each of the two knife rollers 41. Multiple paper shredding knives 42 on one of the two knife rollers 41 and multiple paper shredding knives 42 on another of the two knife rollers 41 are staggered. The paper shredding passage 1 is inserted between the two knife rollers 41. The multiple paper shredding knives 42 extend into the paper shredding passage 1. When the sheet of paper passes through the paper shredding passage 1, for one thing, the multiple paper shredding knives 42 on one of the two knife rollers 41 and the multiple paper shredding knives 42 on another of the two knife rollers 41 rotate towards each other to drive the sheet of paper to be fed towards the paper outfeeding end opening, and for another thing, the multiple paper shredding knives 42 on one of the two knife rollers 41 and the multiple paper shredding knives 42 on another of the two knife rollers 41 cooperate with each other to shred the sheet of paper to fulfill the function of paper shredding.

Exemplarily, as shown in FIG. 4, the multiple paper shredding knives 42 on one of the two knife rollers 41 and the multiple paper shredding knives 42 on another of the two knife rollers 41 are each a cylindrical structure, two ends of a paper shredding knife 4 are each provided with an annular unedged blade 43, and a peripheral portion of the unedged blade 43 is provided with sawteeth. Compared with an existing one-side unedged cutting structure, the paper cutting efficiency of the paper shredding knives 42 in embodiments of the present application is higher, and when the cutter assembly 4 is assembled, there is no need to distinguish the directions of unedged blades 43, saving time and effort and achieving a higher fault tolerance rate.

Exemplarily, as shown in FIG. 4, the core further includes a stripping structure including two stripping blades 44. The two stripping blades 44 are disposed at two ends of the two knife blades 41 facing the open notch 2 in one-to-one correspondence. Cutting portions of the two stripping blades 44 extend into the paper shredding passage 1. The outer diameter of a stripping blade 44 is greater than or equal to the outer diameter of the paper shredding knife 42. The arrangement of the stripping structure can split the region of the sheet of paper into a shredding region and a to-be-shredded region. The shredding region on the sheet of paper is located inside the paper shredding passage 1 and performs shredding through the cutter assembly 4. The to-be-shredded region is located in the region through which the multiple paper shredding knives 42 do not pass. For one thing, the shredding region adapted to the length of the two knife rollers 41 by splitting can reduce the paper rolling problem caused by improper operations of a user, and for another thing, the load of the rotating drive member 5 can be reduced through the operation mode of multiple shreddings.

Exemplarily, as shown in FIG. 4, a first support plate 8, a second support plate 9 and a third support plate 10 are securely disposed inside the chassis. The first support plate 8 is disposed at an end of the cutter assembly 4 facing away from the open notch 2. The second support plate 9 and the third support plate 10 are disposed at an end of the cutter assembly 4 facing the open notch 2. The first support plate 8 is provided with a first mounting through hole 81 and a second mounting through hole 82. The second support plate 9 is provided with a third mounting through hole 83. The third support plate 10 is provided with a fourth mounting through hole. One of the two knife rollers 41 is rotatably inserted through the first mounting through hole 81 and the third mounting through hole 83 and the other one of the two knife rollers 41 is rotatably inserted through the second mounting through hole 82 and the fourth mounting through hole.

In an exemplary embodiment, as shown in FIGS. 5 and 6, the inner side of the first housing 31 is provided with a first upper slot 312, a second upper slot 313 and a third upper slot 314, and the inner side of the second housing 32 is provided with a first lower slot 322, a second lower slot 323 and a third lower slot 324. Two ends of the first support plate 8 are inserted into the first upper slot 312 and the first lower slot 322 separately. Two ends of the second support plate 9 are inserted into the second upper slot 313 and the second lower slot 323 separately. Two ends of the third support plate 10 are inserted into the third upper slot 314 and the third lower slot 324. When the first housing 31 and the second housing 32 are securely interconnected, the mounting positions of the first support plate 8, the second support plate 9 and the third support plate 10 are correspondingly secured.

Exemplarily, the rotating drive member 5 includes a micromotor whose rated voltage does not exceed 36 volts, and the rotating drive member 5 is mounted inside the cavity structure of the chassis through a card slot.

Exemplarily, as shown in FIGS. 1 and 3, the core further includes a switch 13. The switch 13 is electrically connected to the rotating drive member 5 for controlling the start and stop of the rotating drive member 5. The outside of the first housing 31 is movably provided with a knob 14 mechanically connected to the switch 13. The user can switch the states of the switch 13 through the knob 14 to control the start and stop of the rotating drive member 5.

Exemplarily, as shown in FIG. 5, two sides of the paper feeding end opening are each provided with a first sawtooth edge 311. A paper shredding portion of the cutter assembly 4 (that is, the multiple paper shredding knives 42) extends into the paper shredding passage 1 via the notch portion of the first sawtooth edge 311. First sawtooth edges 311 on one side of the paper feeding end opening and first sawtooth edges 311 on another side of the paper feeding end opening are staggered to match the staggered arrangement of the multiple paper shredding knives 4 on the two knife rollers 41.

Exemplarily, as shown in FIG. 5, a side of the first sawtooth edge 311 facing away from the paper shredding passage 1 is provided with a first reverse round corner 3111 for providing an avoidance space for the two knife rollers 41 on the cutter assembly 4 to improve the compactness of the structure and sealing property.

Exemplarily, as shown in FIG. 6, two sides of the paper outfeeding end opening are each provided with a second sawtooth edge 321. A paper shredding portion of the cutter assembly 4 (that is, the multiple paper shredding knives 42) extends into the paper shredding passage 1 via the notch portion of the second sawtooth edge 321. Second sawtooth edges 321 on one side of the paper outfeeding end opening and Second sawtooth edges 321 on another side of the paper outfeeding end opening are staggered to match the staggered arrangement of the multiple paper shredding knives 4 on the two knife rollers 41. Further, the arrangement of the second sawtooth edge 321 is more conducive to the discharge guidance of the shredded paper pieces, and the second sawtooth edge 321 and the second housing 32 are an integrally formed structure, eliminating the need for additional assembly and reducing the production cost.

Exemplarily, as shown in FIG. 6, a side of the second sawtooth edge 321 facing away from the paper shredding passage 1 is provided with a second reverse round corner 3211 for providing an avoidance space for the two knife rollers 41 on the cutter assembly 4 to improve the compactness of the structure and sealing property.

Exemplarily, as shown in FIG. 3, a first reinforcement plate 61 is provided inside the cavity structure, is connected to the first housing 31 through screws and located between the first housing 31 and the cutter assembly 4 and is a U-shaped plate structure, so both the paper shredding passage 1 and the first sawtooth edge 311 are inserted through a first bypass groove 611 of the first reinforcement plate 61, and an opening end of the first reinforcement plate 61 is opposite to the open notch 2. The arrangement of the first reinforcement plate 61 can enhance the strength of the overall structure.

Exemplarily, as shown in FIG. 3, a second reinforcement plate 62 is provided inside the cavity structure, is connected to the second housing 32 through screws and located between the second housing 32 and the cutter assembly 4 and is a U-shaped plate structure, so both the paper shredding passage 1 and the second sawtooth edge 321 are inserted through a second bypass groove 621 of the second reinforcement plate 62, and an opening end of the second reinforcement plate 62 is opposite to the open notch 2. The arrangement of the second reinforcement plate 62 can enhance the strength of the overall structure.

Exemplarily, both the first housing 31 and the second housing 32 are made of plastic, and the first reinforcement plate 61 and the second reinforcement plate 62 are made of metal material or plastic.

Exemplarily, as shown in FIGS. 2 and 3, the outside of the chassis is provided with a accommodating groove 325, and the portable paper shredder further includes an opener 11 detachably connected to the accommodating groove 325. The arrangement and mounting of the opener 11 make full use of the outer space of the portable paper shredder and enrich the functionality of the portable paper shredder.

Exemplarily, one of the opener 11 and the chassis is provided with a magnetic attraction iron sheet and the other one of the opener 11 and the chassis is provided with a magnet 12, and the opener 11 is magnetically attracted to the magnet 12 through the magnetic attraction iron sheet and the magnet. In this embodiment, the magnet 12 is mounted in a position of the inner side of the second housing 32 corresponding to the accommodating groove 325, and the magnetic attraction iron sheet and the opener 11 are integrally formed.

Exemplarily, as shown in FIG. 2, the sidewall of an end of the accommodating groove 325 is provided with a limiting boss 326 for limiting the mounting position of the opener 11 inside the accommodating groove 326. The other end of the accommodating groove 325 is provided with a pullout groove 327 which allows the user to extend his hand into the pullout groove 326 to pull out the opener 11.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations and substitutions without departing from the scope of the present disclosure. Therefore, while the present disclosure is described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A portable paper shredder, comprising a chassis and a core disposed in the chassis, wherein the core comprises a rotating drive member and a cutter assembly that are in transmission connection, the chassis is provided with a paper shredding passage, a paper shredding end of the cutter assembly is located in the paper shredding passage, the paper shredding passage penetrates the chassis, two ends of the paper shredding passage are provided with a paper feeding end opening and a paper outfeeding end opening separately, a side of the paper shredding passage extends outwards and forms an open notch on a sidewall of the chassis, and the open notch directly communicates with the paper feeding end opening.

2. The portable paper shredder according to claim 1, wherein along a penetration direction of the paper shredding passage, the open notch penetrates the sidewall of the chassis and directly communicates with the paper outfeeding end opening.

3. The portable paper shredder according to claim 2, wherein the rotating drive member comprises a micromotor whose rated voltage does not exceed 36 volts.

4. The portable paper shredder according to claim 1, wherein the chassis comprises a first housing and a second housing that are interconnected, and the first housing and the second housing are each a hollow structure and are enclosed to form a cavity structure to accommodate the core.

5. The portable paper shredder according to claim 4, wherein the paper shredding passage penetrates the first housing and the second housing, the paper feeding end opening is disposed on the first housing, and the paper outfeeding end opening is disposed on the second housing.

6. The portable paper shredder according to claim 5, wherein the rotating drive member comprises a micromotor whose rated voltage does not exceed 36 volts.

7. The portable paper shredder according to claim 4, wherein the portable paper shredder satisfies at least one of the following:

a first reinforcement plate is disposed inside the cavity structure, is connected to the first housing and located between the first housing and the cutter assembly and is a U-shaped plate structure, and the paper shredding passage is inserted through a first bypass groove of the first reinforcement plate; or a second reinforcement plate is disposed inside the cavity structure, is connected to the second housing and located between the second housing and the cutter assembly and is a U-shaped plate structure, and the paper shredding passage is inserted through a second bypass groove of the second reinforcement plate.

8. The portable paper shredder according to claim 7, wherein the rotating drive member comprises a micromotor whose rated voltage does not exceed 36 volts.

9. The portable paper shredder according to claim 4, wherein the rotating drive member comprises a micromotor whose rated voltage does not exceed 36 volts.

10. The portable paper shredder according to claim 1, wherein, two sides of the paper feeding end opening are each provided with a first sawtooth edge, a paper shredding portion of the cutter assembly extends into the paper shredding passage via a notch portion of the first sawtooth edge, and first sawtooth edges on the two sides of the paper feeding end opening are staggered; or two sides of the paper outfeeding end opening are each provided with a second sawtooth edge, a paper shredding portion of the cutter assembly extends into the paper shredding passage via a notch portion of the second sawtooth edge, and second sawtooth edges on the two sides of the paper outfeeding end opening are staggered; or two sides of the paper feeding end opening are each provided with a first sawtooth edge and two sides of the paper outfeeding end opening are each provided with a second sawtooth edge, a paper shredding portion of the cutter assembly extends into the paper shredding passage via a notch portion of the first sawtooth edge and a notch portion of the second sawtooth edge, first sawtooth edges on the two sides of the paper feeding end opening are staggered, and second sawtooth edges on the two sides of the paper outfeeding end opening are staggered.

11. The portable paper shredder according to claim 10, wherein, in a case where the two sides of the paper feeding end opening are each provided with the first sawtooth edge, a side of the first sawtooth edge facing away from the paper shredding passage is provided with a first reverse round corner for providing an avoidance space for the cutter assembly; or in a case where the two sides of the paper outfeeding end opening are each provided with the second sawtooth edge, a side of the second sawtooth edge facing away from the paper shredding passage is provided with a second reverse round corner for providing an avoidance space for the cutter assembly; or in a case where the two sides of the paper feeding end opening are each provided with the first sawtooth edge and the two sides of the paper outfeeding end opening are each provided with the second sawtooth edge, a side of the first sawtooth edge facing away from the paper shredding passage is provided with a first reverse round corner for providing an avoidance space for the cutter assembly and a side of the second sawtooth edge facing away from the paper shredding passage is provided with a second reverse round corner for providing an avoidance space for the cutter assembly.

12. The portable paper shredder according to claim 1, wherein the cutter assembly comprises two knife rollers that are spaced apart side by side, each of the two knife rollers is provided with a plurality of paper shredding knives that are spaced apart along a length direction of the each of the two knife rollers, a plurality of paper shredding knives on one of the two knife rollers and a plurality of paper shredding knives on another of the two knife rollers are staggered, the paper shredding passage is inserted between the two knife rollers, and the plurality of paper shredding knives extend into the paper shredding passage.

13. The portable paper shredder according to claim 12, wherein the plurality of paper shredding knives on one of the two knife rollers and the plurality of paper shredding knives on another of the two knife rollers are each a cylindrical structure, and two ends of each of the plurality of paper shredding knives are each provided with an annular unedged blade.

14. The portable paper shredder according to claim 12, wherein the core further comprises a stripping structure comprising two stripping blades, the two stripping blades are disposed at two ends of the two knife rollers facing the open notch in one-to-one correspondence, and cutting portions of the two stripping blades extend into the paper shredding passage.

15. The portable paper shredder according to claim 12, wherein a first support plate, a second support plate and a third support plate are securely disposed inside the chassis, the first support plate is disposed at an end of the cutter assembly facing away from the open notch, the second support plate and the third support plate are disposed at an end of the cutter assembly facing the open notch, the first support plate is provided with a first mounting through hole and a second mounting through hole, the second support plate is provided with a third mounting through hole, the third support plate is provided with a fourth mounting through hole, one of the two knife rollers is rotatably inserted through the first mounting through hole and the third mounting through hole, and another of the two knife rollers is rotatably inserted through the second mounting through hole and the fourth mounting through hole.

16. The portable paper shredder according to claim 12, wherein one of the two knife rollers is in transmission connection with the rotating drive member through a coupling, and the two knife rollers are in transmission connection with each other through a transmission gear assembly.

17. The portable paper shredder according to claim 1, wherein the rotating drive member comprises a micromotor whose rated voltage does not exceed 36 volts.

18. The portable paper shredder according to claim 1, wherein an outside of the chassis is provided with a accommodating groove, and the portable paper shredder further comprises an opener detachably connected to the accommodating groove.

19. The portable paper shredder according to claim 18, wherein one of the opener and the chassis is provided with a magnetic attraction iron sheet, and another one of the opener and the chassis is provided with a magnet, and the opener is magnetically attracted to the chassis through the magnetic attraction iron sheet and the magnet.

20. The portable paper shredder according to claim 18, wherein a sidewall of the accommodating groove is provided with a limiting boss for limiting a mounting position of the opener inside the accommodating groove.

* * * * *